United States Patent [19]

Loos et al.

[11] 3,916,694
[45] Nov. 4, 1975

[54] CONTINUOUS CONTAINER INSPECTION MACHINE

[76] Inventors: Theodore G. Loos, Oscawane Heights Road, Putman Valley, N.Y. 10579; David F. Sklar, deceased, late of Kent Cliffs, N.Y., by Francis S. Stein, executrix, 120 Chestnut Road, Manhasset, Long Island, N.Y. 11030

[22] Filed: Dec. 14, 1973

[21] Appl. No.: 424,649

[52] U.S. Cl. ............................. 73/432 R; 209/80
[51] Int. Cl.² ......................................... B07C 5/00
[58] Field of Search ............. 73/104, 105, 37.6, 41, 73/45.1, 45.2, 432 R; 209/80, 88 R

[56] References Cited
UNITED STATES PATENTS 3,422,542 1/1969 Spurr .......................... 209/80 X
3,814,241 6/1974 Sklar ........................... 209/80

*Primary Examiner*—Charles A. Ruehl
*Attorney, Agent, or Firm*—Smythe & Moore

[57] ABSTRACT

A machine for inspecting the openings of glass bottles or containers comprises a plurality of pairs of inspecting heads positioned over a line of containers conveyed in a forward direction. The pairs of heads are reciprocated with respect to each other such that the feelers of one pair are lowered into inspecting position on the containers when said one pair of heads is moving in the forward direction, the other pair of heads moving in the reverse direction with the feelers thereof raised from the inspecting position.

5 Claims, 11 Drawing Figures

CONTINUOUS CONTAINER INSPECTION MACHINE

The present invention relates to a machine for continuously inspecting containers or bottles to determine the acceptability thereof and, more particularly, to such a machine having a plurality of pairs of inspecting heads.

In the production of containers, such as glass bottles, considerable difficulty has been encountered in providing a testing or inspection system which will continuously inspect the lips of bottles and reject those bottles having defective lips and those bottles that are to short. At the same time, the inspection system must operate continuously but must not reject bottles which are actually usable. Such an inspection apparatus must be adjustable to accomodate various sizes of containers and must be relatively fast in its operation. The machine should be able to inspect a number of bottles at the same time so as to increase significantly the number of bottles which can be inspected for a unit time. However, the mere speeding up of such a machine will not accomplish increased inspection speeds since it has been found that faster operating machines must have substantial modifications in their structure.

One of the objects of the invention is to provide a machine which will continuously inspect and classify bottles at a high rate of speed without unnecessarily rejecting usable bottles.

Another of the objects of the invention is to provide such a machine having an improved structure for raising and lowering the inspecting heads with respect to the bottles.

According to one aspect of the present invention, a continuous container inspection machine has means for conveying a line of containers through the machine in a forward direction. A plurality of pairs of rotatable inspecting heads having feelers thereon are positioned over the line of conveyed containers. The pairs of inspecting heads are reciprocable with respect to each other. During reciprocation, the heads are continuously being rotated. Means are provided for lowering the feelers of the heads to bring the feelers of one pair of heads into testing position onto the containers as that pair of heads is being moved in the forward direction. At the same time, means are provided for raising the feelers of the heads of the other pair which is traveling in a reverse direction of the containers. A suitable indication system is provided so that if a reject signal is produced, a gate or other device will be operated to reject a faulty container. The test heads can also detect containers that are too short.

The invention is an improvement over U.S. Pat. No. 3,618,762, issued Nov. 9, 1971, and U.S. Pat. No. 3,814,241, issued June 4, 1974.

These and other objects, advantages and features of the invention will become apparent from the following description and drawings which are merely exemplary.

In the drawings:

FIG. 3 is a fragmentary top plan view in enlarged scale of the cams, cam rollers and actuator link of a pair of inspecting heads;

FIG. 4 is a view similar to that of FIG. 3 but showing the cams pivoted to a position to raise the feelers;

FIG. 7 is an elevational view taken along the line 7—7 of FIG. 2;

Proceeding next to the drawings wherein like reference symbols indicate the same parts throughout the various views, a specific embodiment of the present invention will be described in detail.

Figure 1:
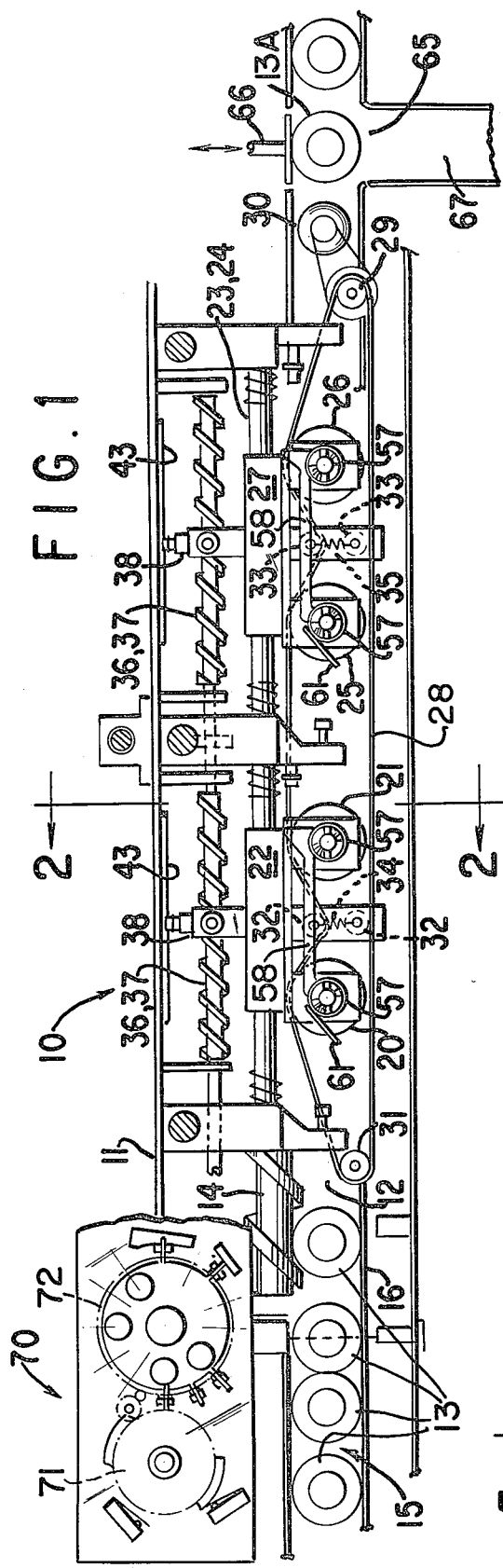
FIG. 1 is a top plan view of the inspection machine of the present invention.
Figure 2:
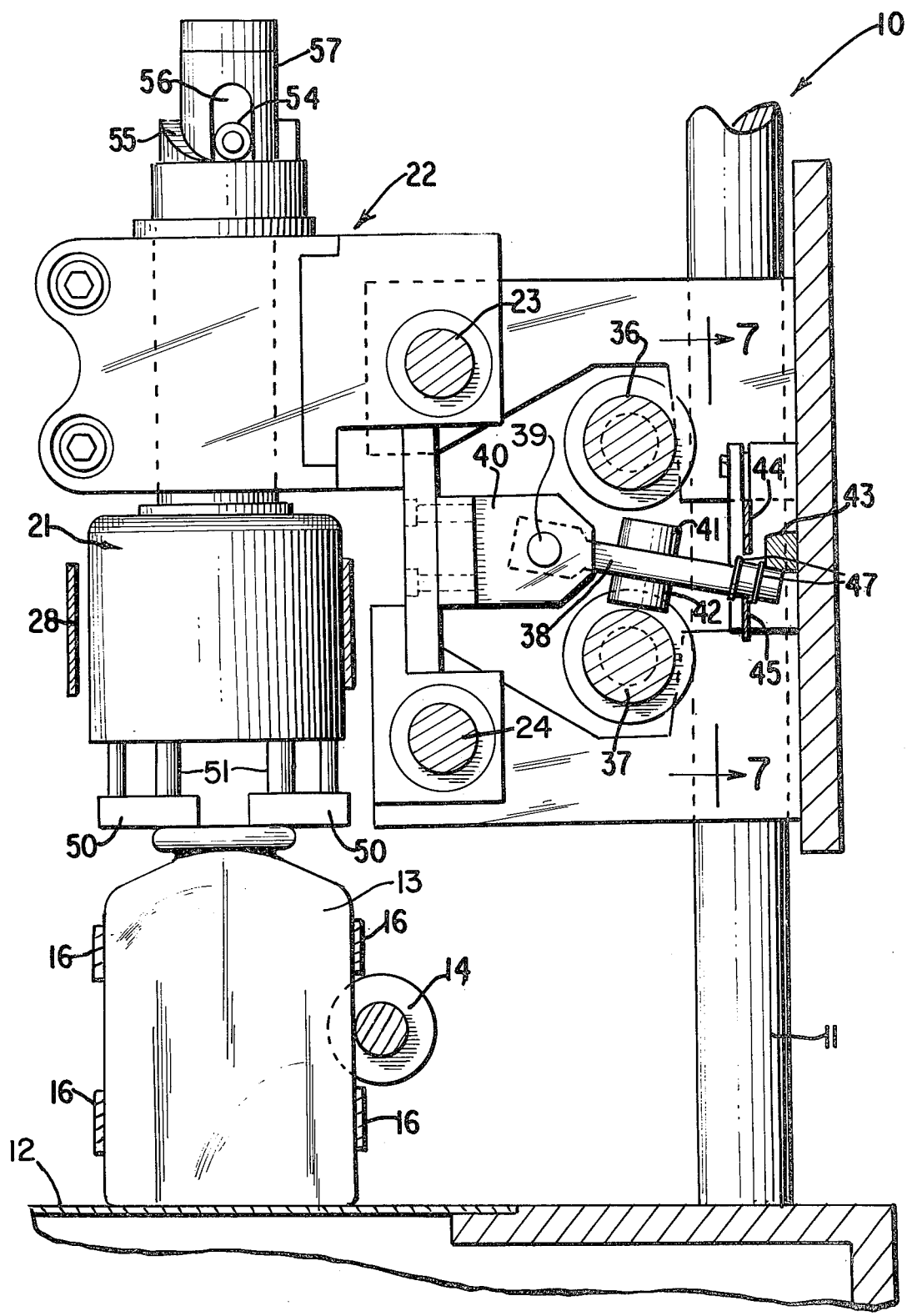
FIG. 2 is an enlarged sectional view taken along the line 2—2 of FIG. 1.

As can be seen particularly in FIGS. 1 and 2, the machine is indicated generally at 10 and comprises a frame 11 upon which is mounted a track surface 12 upon which a line of glass bottles 13 is conveyed by means of a coarse thread conveyor screw 14. The pitch of the threads of screw 14 is selected according to the diameter or size of the bottles to be classified. The bottles 13 are fed onto the conveyor at entrance 15 and are guided by adjustable guard rails 16 to accomodate bottles of different diameters. The guide rails are mounted so as to be readily removable in order to adapt the machine to different size bottles.

A pair of rotatable inspecting heads 20 and 21 are positioned over track 12 and are mounted on carriage 22 for reciprocating movement upon rods or tracks 23 and 24. A second pair of rotatable inspecting heads 25 and 26 are similarly positioned over track 12 and are mounted on carriage 27 slidable upon rods 23 and 24. The heads are rotated by belt 28 driven by pulley 29 drivingly connected to motor 30. The other end of the belt 28 is carried on an idler pulley 31. The portions of the belts between each pair of inspecting heads is drawn together by spring urged rollers 32 and 33 which are drawn together by springs 34 and 35 as shown schematically in FIG. 1.

The pairs of inspecting heads 20, 21 and 25, 26 are reciprocated on rods or rails 23 and 24 by lead screws 36 and 37.

Each pair of testing heads is reciprocated oppositely relative to each other in the proper direction by means of a rockable lever 38 pivotally mounted at 39 on brackets 40 extending from each carriage 22 and 27. The lever 38 has oppositely disposed lead screw-engaging blocks 41, 42 (FIG. 2) which are engageable with lead screws 36 and 37, respectively.

The end of lever 38 moves over cam guide surface 43 (FIGS. 1, 2 and 7) and is urged into engagement with the guide surface 43 by spring biased arms 44 and 45 biased by springs 44A and 45A. When lever 38 is moving in the direction indicated by the arrow 46 (FIG. 7) and reaches the end of cam surface 43, the spring biased arm 44 will urge the end of lever 38 downwardly around the right hand end 43A of cam 43 so that screw-engaging block 42 will engage lead screw 37 and the carriage will move in the reverse direction. When lever end 38 reaches the other end of cam surface 43, the spring biased arm 45 will act in the same manner. Lever 38 may be provided with spaced annular ribs 47 for guidance with respect to arms 44 and 45.

Thus, the direction of movement of a pair of inspecting heads will depend on which of the lead screws 36 or 37 is engaged by a block 41 or 42.

Figure 5:
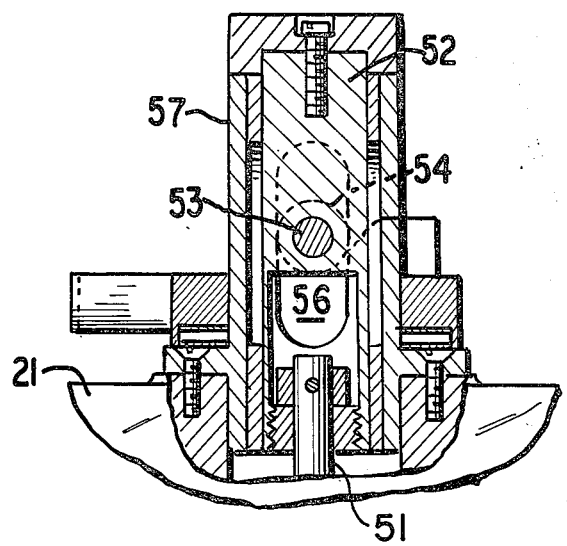
FIG. 5 is a sectional view taken along the line 5—5 of FIG. 3.

Each rotatable inspecting head, such as for example, head 21, is provided with bottle contacting rollers or feelers 50, both of which are mounted on a vertically reciprocable shaft 51 (FIG. 5) slidably carried within head 21 and shown at its upper end in FIG. 5. The construction of rotatable head 21 can be similar to the rotatable head disclosed in U.S. Pat. No. 3,814,241, issued June 4, 1974.

The upper end of the shaft 51 is connected to block 52 which carries shaft 53 on both ends of which are positioned cam rollers 54 which ride upon cam surface 55 fixed on top of rotatable head 21. Cam rollers 54 are guided for vertical movement within a guide slot 56 formed in supporting member 57.

Figure 6:
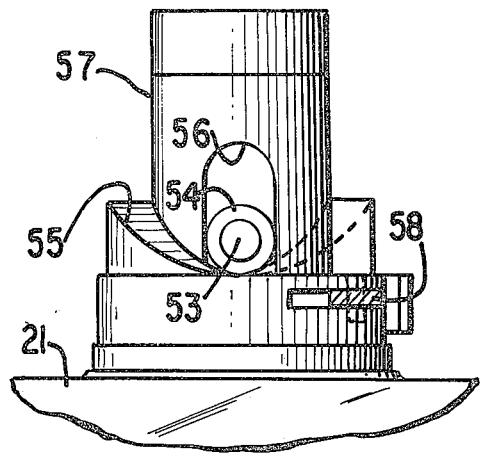
FIG. 6 is a sectional view taken along the line 6—6 of FIG. 3.

Cams 55 of a pair of rotatable heads are interconnected by cam actuator link 58 (FIGS. 3, 4, 6) which is pivotally mounted at 59 to the respective cams. One end of link 58 is provided with an abutment head 60 (FIGS. 3, 4) and the other cam 55A (FIGS. 3, 4) is provided with a cam bar 61 attached to cam 55A at 62. Operation of the cams will be described hereafter.

A rejection station for removing a defective bottle is seen at 65 in FIG. 1 wherein a solenoid, not shown, when activated moves a pusher 66 which in turn pushes a defective bottle 13A off the track 12 and onto reject conveyor 67. Acceptable bottles continue along track or conveyor 68.

Figure 8:
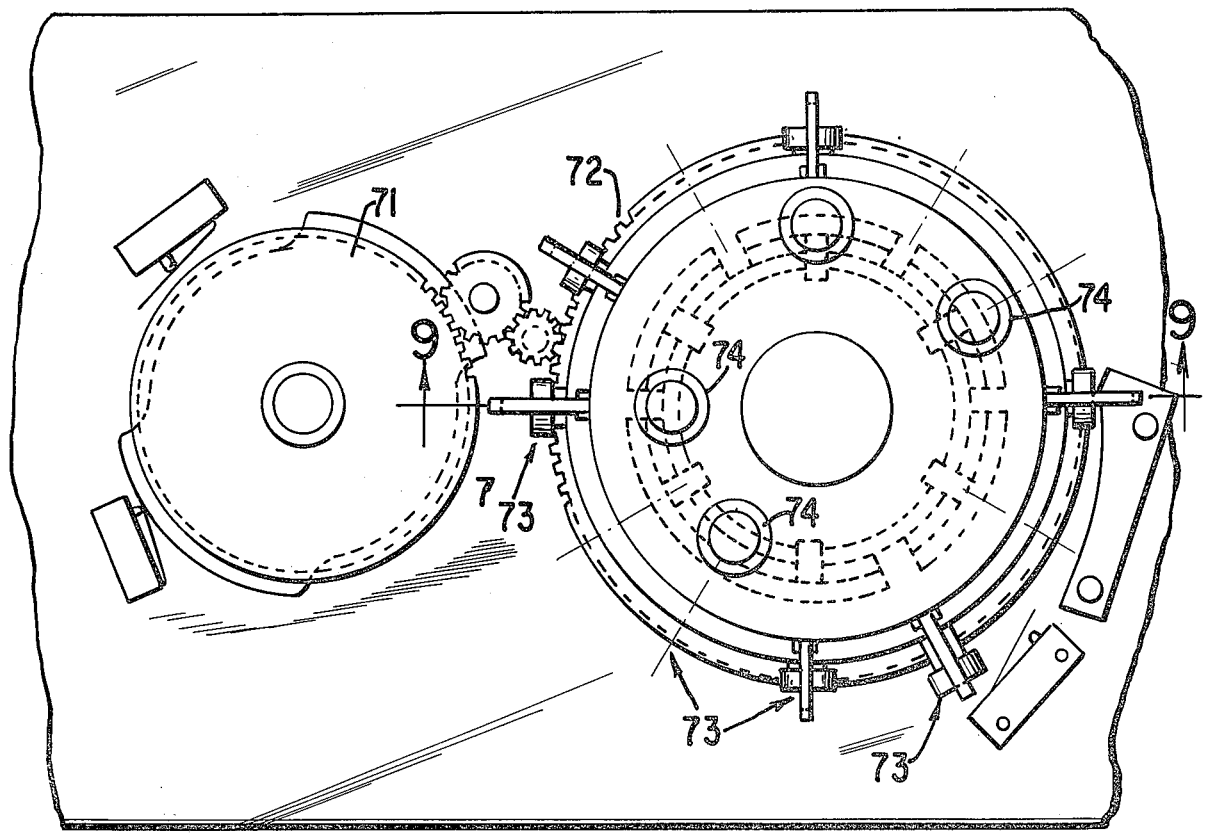
FIG. 8 is an enlarged fragmentary plan view of the control mechanism shown at the left end of the machine in FIG. 1.
Figure 9:
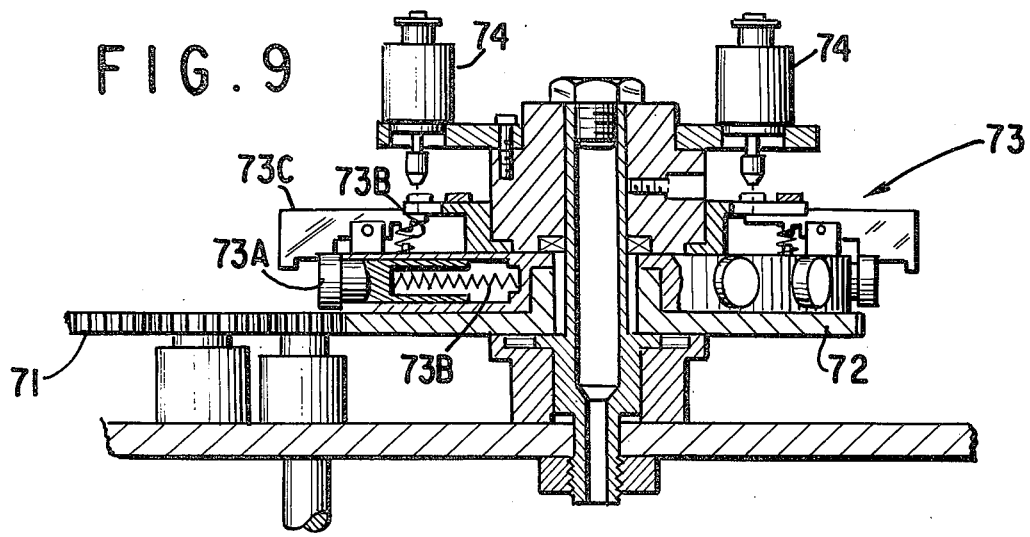
FIG. 9 is a sectional view taken along the line 9—9 of FIG. 8.

Signals for the reject action are transmitted to the reject device by a memory mechanism 70, shown at the left in FIG. 1 and illustrated in greater detail in FIGS. 8 and 9. Discs 71 and 72 are rotated in timed relation with movements of the bottles through the machine by means of suitable drive means for the various conveyors, heads, head drives and other related components.

One of the signal activated means 73 which is carried on disc 72 is provided with a trip plunger 73A which may be normally urged downwardly by a spring 73B that is restrained from downward movement by a pivoted latch 73C.

When a reject signal is received by the circuit in response to sensing a defective bottle, the signal will be directed to the proper signal-activated means 73 through an appropriate switch closed or actuated by a cam on the disc 71. An energized solenoid will then release a plunger to actuate a switch to give a pulse to solenoid 74 at the proper time. Further movement of the disc 72 will cause the plunger to move over a suitable cam and relatch the plunger. Various types of actuating circuits can be used, and the memory mechanism disclosed in Applicant's above-mentioned U.S. Pat. No. 3,814,241 may be employed.

Bottles having a mouth with an angle thereacross within certain limits are usable, providing the lips are smooth. If the angle is too great or the bottle is too short, it is not acceptable. The angle of the lip must be such that a cap can be properly placed thereon. If there are any dips, nicks, or depressions in the lip, then a cap will not seal and the bottle is not acceptable.

Figure 10:
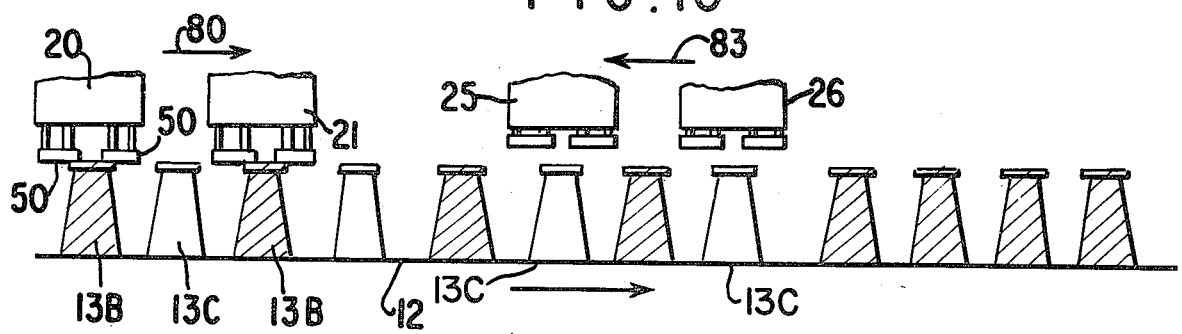
FIG. 10 is an elevational view of the line of conveyed containers and showing the inspection heads positioned with respect to the containers.

As can be seen in FIG. 10, containers 13 are tested in pairs, and for illustrative purposes, the bottles tested by heads 20, 21 are shaded and indicated at 13B, and the bottles tested by the second pair of heads 25, 26 are unshaded and indicated at 13C.

As described in U.S. Pat. No. 3,814,241 during testing of each bottle, the rollers or feelers 50 on a head roll around the lip of the bottle to generate signals if the bottle is too short or if the lip is angled. These signals are transmitted to the memory mechanism 70 for actuating the bottle rejection mechanism if the angle is too great or the bottle too short.

Operation of the apparatus is illustrated in FIG. 10 wherein the pair of heads 20, 21 are down and in testing position at the beginning of the test cycle. The heads are beginning their movement to the right as indicated by the arrow 80. As the heads begin their travel in this direction to the right, the cam bar 61 (FIGS. 3, 4) is pulled by the spring loaded trigger 81 into the position from that shown in FIG. 4 to that seen in FIG. 3 which causes the cams 55, 55A to rotate in a clockwise direction (FIG. 3) which lowers the test rollers 50 of the inspecting heads into contact with the lips of the bottles.

Cam actuator link 58 by means of base 60 strikes reset bar means as the heads 20, 21 reach the end of the cycle and the cams rotate in a counter-clockwise direction which raises the test rollers 50 from the bottle. At the same time, lever 38 is actuated so that one of the blocks 41, 42 is placed into engagement with the lead screw to reverse the direction of movement of the heads 20, 21 and return the heads to their position at the beginning of the test cycle. During the above-described movement of the heads 20, 21, the heads 25, 26 are moving oppositely thereto. While the heads 20, 21 are moving to the right at the beginning of the test cycle, the heads 25, 26 are being reversed and moving to the left in the direction of the arrow 83 (FIG. 10) to return these heads to the beginning of their test cycle upon a pair of the alternate unshaded bottles 13C. The inspecting rollers of heads 25, 26 are in the raised position and will be lowered into the inspecting positions for the next test cycle at the end of the return movement when the cam bar contacts the magnet 84 and engages the spring assist trigger as shown in FIG. 4.

Figure 11:
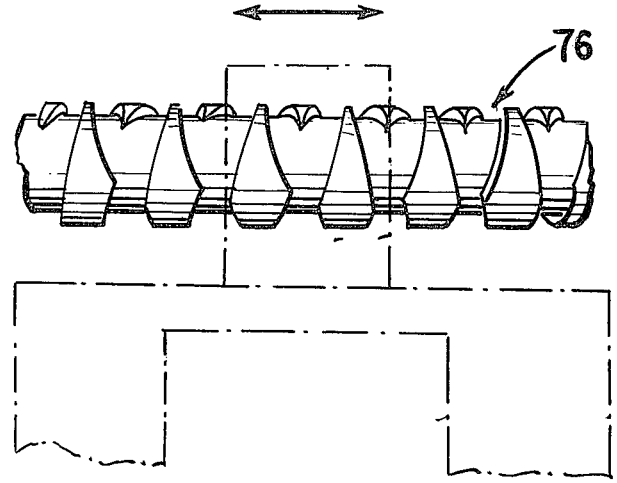
FIG. 11 is an elevational view of a portion of an alternate type lead shaft to which a pair of heads can be connected for reciprocating movement.

In place of the two lead screws 36, 37, it is possible to use a reversing lead screw 76 shown in FIG. 11.

Each pair of heads thus inspects alternate bottles and the movement of the pairs of heads with respect to each other is timed to coincide with the movement of the conveyed containers so that each of the containers are inspected as indicated by all of the shaded bottles at the right-hand end of FIG. 10.

It will be understood that various details of construction and arrangement of parts may be made without departing from the spirit of the invention except as defined in the appended claims.

What is claimed is:

1. In a continuous container inspection apparatus, the combination of means for conveying a line of containers through the apparatus in a forward direction, a plurality of pairs of rotatable inspecting heads having feelers thereon and positioned over the line of containers as they are being conveyed, each pair being spacedly mounted on a reciprocable carriage, means for reciprocating each of said carriages with said pairs of heads thereon with respect to each other, means for rotating the heads during reciprocation of the carriages with respect to each other, means for lowering the feelers of the heads to bring the feelers of said heads into testing position onto containers as a carriage with a pair of heads is being moved in the forward direction, means for raising the feelers of the heads of the other pair on the other carriage which is traveling in a reverse direction of the containers, the heads of a pair being spaced to contact alternate containers of the conveyed line of containers, a single belt drivingly engaging both heads to each of said pairs, means for driving said belt, means for maintaining said belt in driving relationship with said heads during reciprocation thereof to continuously rotate the heads, means for reciprocating said carriages relative to each other including a pair of lead screws for each carriage and a rockable lead screw engaging means, spring biased means for urging said lead screw engaging means into engagement with the other lead screw after moving along one lead screw a predetermined amount, and means on each pair of heads for simultaneously raising and lowering the feelers of that pair when the direction of reciprocating movement of said pair is reversed, said raising and lowering means comprising interconnected cams.

2. In a continuous container inspection apparatus, the combination of means for conveying a line of containers through the apparatus in a forward direction, a plurality of pairs of rotatable inspecting heads having feelers thereon and positioned over the line of containers as they are being conveyed, means for reciprocating said pairs of heads with respect to each other, means for rotating the heads during reciprocation of the pairs with respect to each other, means for lowering the feelers of the heads to bring the feelers of said heads into testing position onto containers as a pair of heads is being moved in the forward direction, means for raising the feelers of the heads of the other pair which is traveling in a reverse direction of the containers, the feelers on each head being movable with respect to said head, means on each pair of heads for simultaneously raising and lowering the feelers of the pair when the direction of reciprocating movement of said pair is reversed, said raising and lowering means comprises interconnected cams, a vertically reciprocal shaft in each head, the feelers of said head being mounted on the lower end of said shaft, a cam roller on the upper end of said shaft, said cam being on the top of each head and engaged by said roller, and means for pivoting concurrently said cams on a pair of heads to raise and lower said roller and thereby said feelers.

3. In an apparatus as claimed in claim 2 and an actuator link pivotally connecting both cams of a pair of heads.

4. In an apparatus as claimed in claim 3 wherein said cam pivoting means comprises a cam bar on one cam of a pair, and means engageable by said cam bar to pivot said interconnected cams in one direction.

5. In an apparatus as claimed in claim 4 and means engageable by one end of said actuator link to pivot said interconnected cams in the other direction.

* * * * *